June 16, 1925.                    E. R. EVANS                    1,541,803
                                 MOTOR VEHICLE
                     Filed March 5, 1923        2 Sheets-Sheet 2
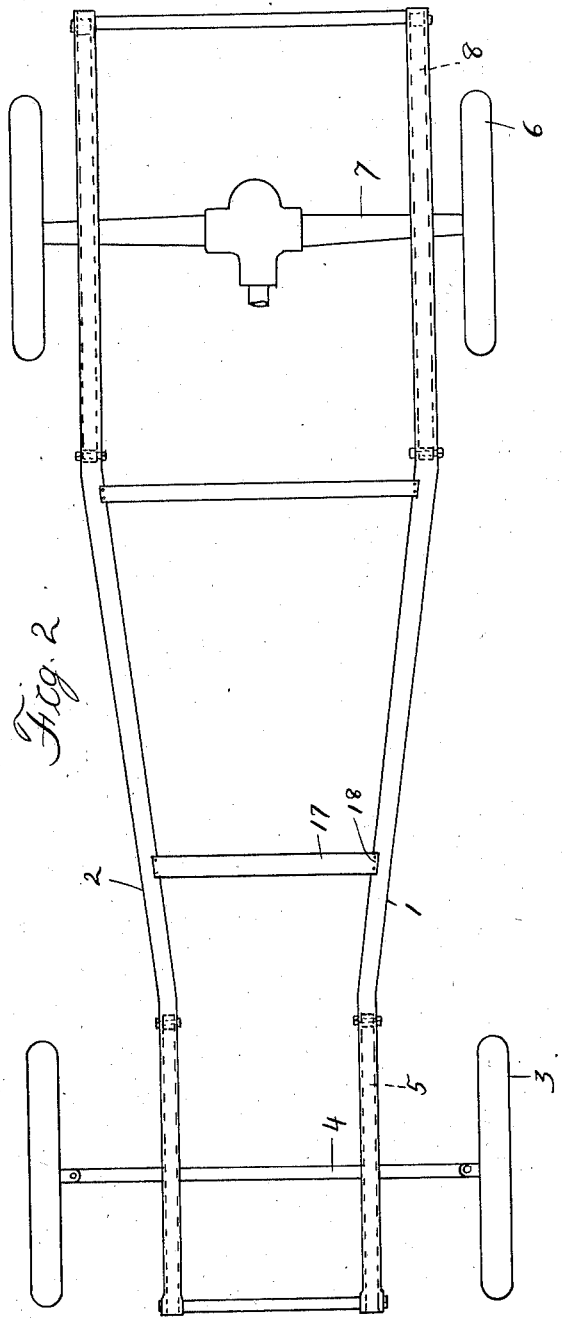
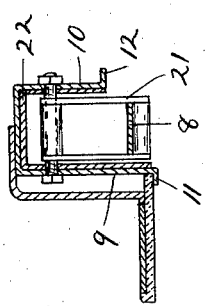
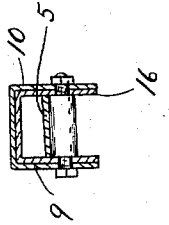
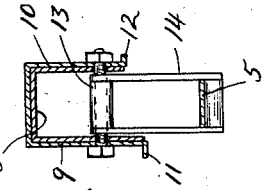
Inventor
Edwin R. Evans
By Whittemore Hulbert Whittemore
   Belknap           Attorneys Patented June 16, 1925.

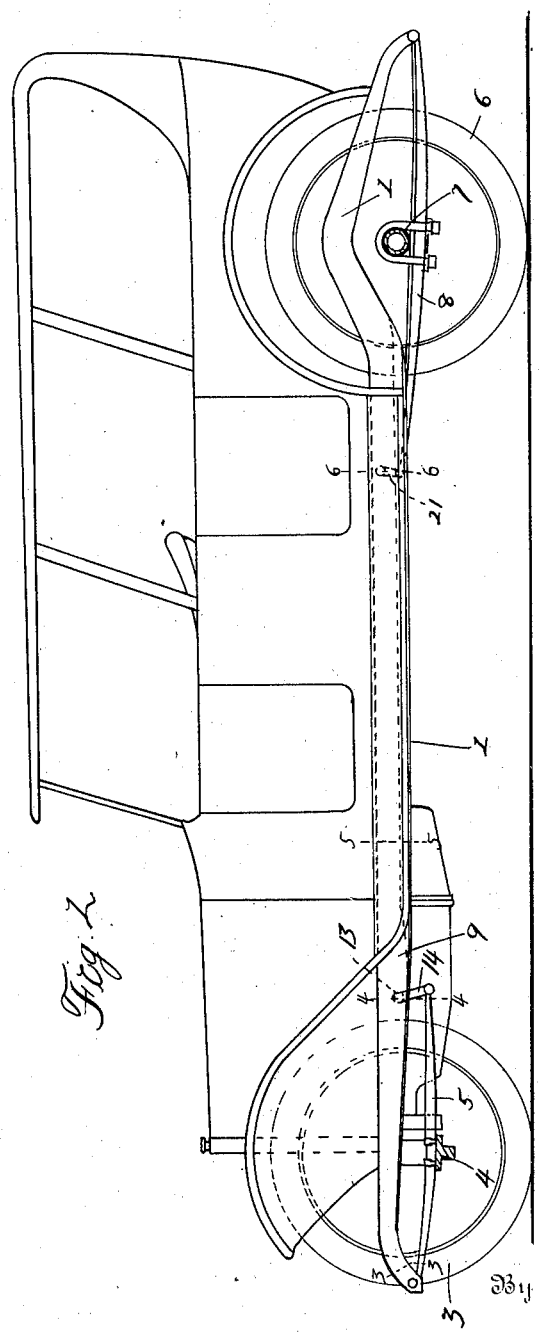

1,541,803

UNITED STATES PATENT OFFICE.

EDWIN R. EVANS, OF DETROIT, MICHIGAN.

MOTOR VEHICLE.

Application filed March 5, 1923. Serial No. 623,047.

*To all whom it may concern:*

Be it known that I, EDWIN R. EVANS, a citizen of the United States of America, residing at Detroit, in the county of Wayne and State of Michigan, have invented certain new and useful Improvements in Motor Vehicles, of which the following is a specification, reference being had therein to the accompanying drawings.

The invention relates to motor vehicles and has particular reference to the frames thereof. The invention has for some of its objects the provision of a frame of strong construction and reduced weight; of a frame having channel side sills provided with reinforcing flanges to which the cross bars of the frame are secured; and of a frame having channel side sills so arranged that the springs connecting the side sills to the axles may flex into the side sills. Another object resides in the arrangement of springs extending between the rear or drive axle and the side sills of the frame and carrying both the driving and torque stresses, this arrangement decreasing the lateral movement or side sway of the motor vehicle body as well as decreasing its vertical movement.

In the drawings:

Figure 1 is a side elevation with parts broken away of a motor vehicle embodying my invention;

Figure 2 is a plan view of a frame thereof;

Figures 3, 4, 5 and 6 are cross sections on the lines 3—3, 4—4, 5—5 and 6—6 of Figure 1.

The frame of the motor vehicle comprises the spaced side sills 1 and 2 having parallel front and rear end portions connected by intermediate portions, the front end portions being spaced apart a distance less than that between the rear end portions. 3 are the front wheels upon the front axle 4, and 5 are semi-elliptic leaf springs between the front end portion of the frame and the front axle. 6 are the rear or drive wheels upon the rear or drive axle 7, and 8 are semi-elliptic leaf springs between the rear end portion of the frame and the drive axle.

For the purpose of forming a chassis or frame having great strength with minimum weight and at the same time permitting the springs between the frame and the axles to enter into the side sills of the frame, each of the side sills 1 and 2 is a downwardly opening channel having vertically extending outer and inner legs 9 and 10 respectively which are spaced sufficiently to permit of the entrance therebetween of the springs 5 and 8 and which have at the lower ends of their legs the transverse outwardly extending foot flanges 11 and 12 for reinforcing the sill. The outer leg 9 of each side sill has the greatest depth in that length of the side sill between the point where the greatest stress is occasioned by the vehicle body frame and the point where the side sill rises to pass over the rear or drive axle. The inner leg 10 of each side sill has a uniform depth in that portion of the side sill in which the outer leg has its greatest depth such that the horizontal neutral axis for this portion of the side sill passes through the reinforcing foot flange 12. The depth of the inner leg increases forwardly from this portion of the side sill to receive the pivot 13 which passes transversely through both the outer and inner legs and upon which is mounted the shackle 14, the lower end of which is pivotally connected to the rear end of the front spring 5. This pivot portion of the side sill is reinforced by the U-shaped stamping 15 nested within the side sill and secured thereto, the pivot 13 passing through its legs also. The front end of the front spring is pivotally connected to the front end of the side sill directly by a pivot passing through both the outer and inner legs of the channel sill which is preferably reinforced by a U-shaped stamping 16 similar to the reinforcing stamping 15.

17 is one of a series of cross bars between the side sills 1 and 2, this cross bar being preferably formed of a stamping having its main body portion arranged in a vertical plane with its upper and lower edges curved upwardly from their points of connection to the side sills. This cross bar has at each end the horizontal transverse flange 18 resting upon and fixedly secured to the top of the side sill, the vertical transverse flange 19 secured to the inner side of the inner leg 10 of the side sill and resting upon the foot flange 12. Thus it is seen that the transverse foot flange upon the inner leg of the side sill in addition to reinforcing the side sill forms a support for the cross bars extending between the side sills. To reinforce the side sills, I have provided the inclined braces 20 extending from the foot flange of the inner leg to the foot flange of the outer leg and fixedly secured thereto, thereby forming a box construction of sill at this point. This inclined brace is preferably formed integral with the cross bar 17.

The transverse outwardly extending foot flanges 11 upon the outer legs 9 of the side sills in addition to reinforcing the side sills function as a support for the running boards of the vehicle body, which are secured upon these flanges.

Thus it is readily seen that I have provided a strong construction of frame of very light weight which can be readily stamped or pressed out and which permits of assembly with the vehicle body in a manner to lower the center of gravity.

For the purpose of reducing the side sway of the motor vehicle and facilitating its keeping to the road, the rear springs 8 which take care of both the torque and the drive are pivotally connected to the rear ends of the side sills and are connected in advance of the rear or drive axle at their front ends by means of shackles. As shown, 21 are the shackles, the upper ends of which are pivotally connected to the side sills, and the lower ends of which are pivotally connected to the front ends of the rear springs. The pivots for the upper ends of these shackles extend transversely through both the outer and inner legs of the side sills as well as the legs of the U-shaped reinforcing stamping 22 nested within each side sill and secured thereto. Since the rear ends of the rear springs are pivotally connected to the side sills and consequently have no relative longitudinal movement, and since the front ends of the rear springs are connected to the side sills by means of shackles which permit of relative longitudinal movement, the frame is pulled forwardly from the rear or drive axle by the rear springs and side sway of the vehicle body is decreased. Also this arrangement functions to maintain the rear end of the frame in its normal position, and consequently assists in preventing a series of upward and downward movements thereof when the rear drive wheels are passing over a bump in the road.

What I claim as my invention is:

1. In a vehicle, a frame having a channel sill with vertically extending legs and transverse flanges at the ends of the legs, a portion of one leg intermediate the ends of the sill being of a height to locate its transverse flange adjacent to the horizontal neutral axis of the sill passing through the legs.

2. In a vehicle, a frame having a downwardly opening channel sill with vertically extending legs and transverse foot flanges upon the legs, one of the legs having a greater height at a point intermediate the ends of the sill than at the ends thereof and the other of the legs having portions of different heights longitudinally of the sill.

3. In a vehicle, the combination with a frame having a downwardly opening channel sill with vertically extending legs and transverse foot flanges upon the legs, of a spring extending longitudinally below the sill and movable thereinto between the foot flanges.

4. In a vehicle, a frame having spaced downwardly opening channel sills with vertically extending legs and transverse outwardly extending flanges upon the legs, a cross bar extending between the sills and secured to the top of each channel sill and its inner leg, and braces extending between and secured to the foot flanges of each sill in substantial alignment with the cross bar.

5. In a vehicle, a frame having spaced downwardly opening channel sills with vertically extending legs and transverse foot flanges upon the legs, and a cross bar formed of a stamping and secured at its opposite ends to the top of each channel sill as well as its inner leg, said cross bar also having at its opposite ends an integral brace extending between the foot flanges of each sill.

6. In a vehicle, a frame having spaced downwardly opening channel sills with vertically extending legs and transverse outwardly extending foot flanges upon the legs, a cross bar between the sills resting upon the transverse foot flanges of the inner legs of said sills, and running boards resting upon the transverse foot flanges of the outer legs.

7. In a vehicle, a frame having a channel-shaped sill with vertically extending legs and a transverse flange upon one of said legs at an intermediate height of the sill and a cross member engaging said sill having a portion seating upon said flange.

8. In a vehicle, a frame comprising a pair of downwardly opening channel-shaped sills having portions of their inner walls of a depth less than the outer walls, said portions being flanged toward each other at their lower edges and a cross member connecting said sills and seating upon said flanges.

In testimony whereof I affix my signature.

EDWIN R. EVANS.